United States Patent Office
3,052,133
Patented Sept. 4, 1962

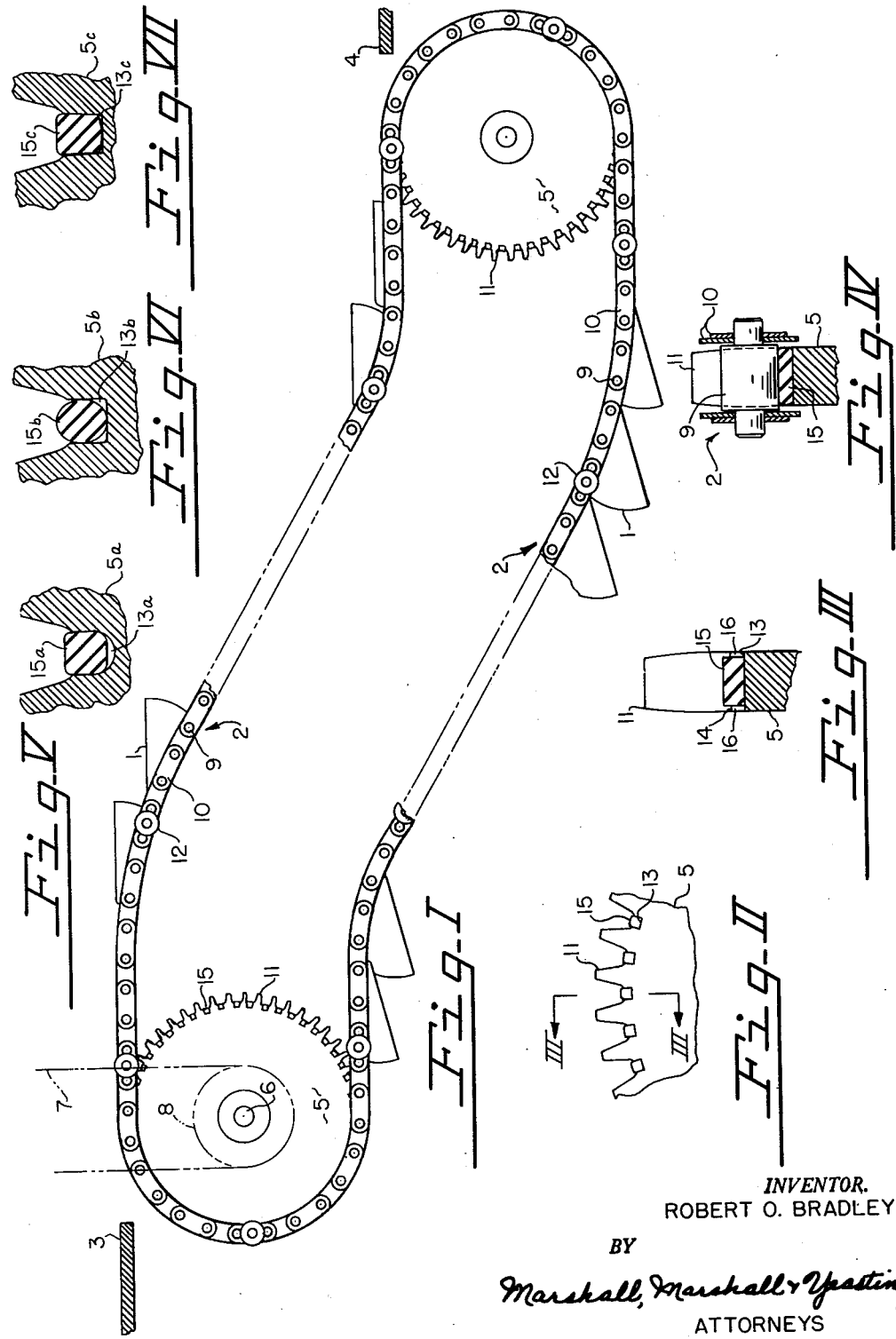

3,052,133
DRIVE FOR MOVING STAIRWAYS
Robert O. Bradley, Toledo, Ohio, assignor to Toledo Scale Corporation, Toledo, Ohio, a corporation of Ohio
Filed Dec. 16, 1959, Ser. No. 859,985
9 Claims. (Cl. 74—243)

This invention relates to sprocket wheels for endless drive chains and more particularly to silently operable sprocket wheels.

The silently operable sprocket wheels are particularly well suited for supporting and driving the stairway steps in moving stairways. Heretofore, considerable difficulty has been experienced in attempting to drive such stairway steps silently because the endless chains which carry the steps clash with their wheels at the lower and upper landings. Prior installations have included tires on the step chain rollers or resilient facings for the teeth of the step chain sprocket wheels which were vulcanized directly to the teeth or resilient facings for the teeth of the step chain sprocket wheels which were vulcanized on metal pieces attached to the teeth or cams for guiding the step chains into engagement with their sprocket wheels. These drives are generally unsatisfactory; among other things, the tires on the step chain rollers are of high cost, the resilient facings on the sprocket teeth are of high cost and have a short life in the field, and the cams do not solve the problem of noise.

It is, accordingly, the principal object of this invention to provide a silent drive of relatively simple construction for driving endless chains.

Another object of the invention is to provide a relatively silent drive for operating moving stairways.

Still another object is to provide improved step chain wheels for driving the stairway steps in moving stairways relatively silently.

A further object is to provide improved means for operating stairway steps in moving stairways.

Other objects and advantages will be apparent from the following description in which reference is had to the accompanying drawings.

Preferred forms of the silent drive are illustrated in the accompanying drawings.

In the drawings:

FIG. I is a fragmentary view in side elevation of the stairway steps in a moving stairway provided with silently operable step chain wheels according to the invention;

FIG. II is an enlarged, fragmentary view of one of the two wheels which are illustrated in FIG. I;

FIG. III is a vertical sectional view taken along the line III—III of FIG. II;

FIG. IV is a sectional view which shows the wheel that is illustrated in FIG. III under a chain roller load;

FIG. V is a sectional view which corresponds to FIG. II of a modified form of the wheel;

FIG. VI is a sectional view which corresponds to FIG. II of another modified form of the wheel; and FIG. VII is a sectional view which corresponds to FIG. II of another modified form of the wheel.

These specific figures and the accompanying description are intended merely to illustrate the invention and not to limit its scope.

A moving stairway comprises an endless series of movable steps 1 disposed to be moved along tracks by means of endless chains 2 between an upper landing 3 and a lower landing 4 as shown and described, for example, in U.S. Patent No. 2,225,772 issued on Dec. 24, 1940 to James Dunlop. Each of the endless chains 2 is supported at the landings by sprocket wheels 5, one an idler wheel and one a drive wheel, that are driven by means of a motor operatively connected to a shaft 6 upon which the drive wheels are mounted as also shown and described in the foregoing patent.

A traveling flexible endless handrail (not shown) is provided at each side of the steps 1 to move at the same speed as the steps. Each of the handrails is mounted upon a drive sheave at the upper landing and upon an idler sheave at the lower landing as also shown and described in the foregoing patent. An endless chain 7 is disposed over a sprocket 8 attached to the drive step chain sprocket wheel 5 and over a sprocket wheel attached to one of the handrail drive sheaves and drives the handrails in accordance with movement of the stairway steps 1.

The endless chain 2 includes a plurality of rollers 9 which are linked in the customary way by means of side plates or links 10 and has a pitch double that of the teeth 11 in the sprocket wheels 5 so that the rollers 9 are received in every other one of the spaces between the teeth, some of the spaces not occupied by the rollers 9 receiving bushings which journal rollers 12 carried one by every fourth plate or link 10 as viewed in FIG. I and movable along the foregoing tracks. The sprocket wheels 5 are identical; hence, a description of one is a description of both. Considerable difficulty heretofore has been experienced in preventing clashing between the rollers 9 and the teeth 11 while they are engaged and particularly when the rollers first meet the teeth at the ends of their path of travel. The essence of the invention is the provision of cushioning means on the wheels 5 for producing a relatively silent drive.

Lateral grooves 13 which are rectangularly shaped as viewed in FIG. II are formed at the roots 14 of the sprocket teeth 11. This produces a cavity between each of the teeth which extends from one side of the sprocket wheel 5 to the other. A resilient insert 15 of rubber or rubber-like material which has a normal end view as seen in FIG. II generally similar to that of the rectangular shapes of the grooves 13 as viewed in FIG. II is received in each of the grooves. The normal width of the resilient insert 15 as viewed in FIG. II is wider than the width of the groove 13 so that it is necessary to force the insert into the groove, the insert remaining in the groove during operation of the moving stairway by its own resiliency without the need for adhesives or any other fastening means. The normal height of the resilient insert 15 as viewed in FIGS. II or III is greater than the depth of the groove 13 so that the resilient insert projects out of the groove beyond the tooth root 14. As best shown in FIG. III, about one-third of the resilient insert 15 projects out of the groove 13 beyond the tooth root 14. The normal length of the resilient insert 15 as viewed in FIG. III is less than that of the groove 13 so that a space 16 is provided at each of the ends of the insert into which the insert flows under load. Should the insert flow under load much beyond the sprocket wheel it might be damaged by blows during operation from the chain links 10. As shown in FIG. II, the upper edges of the resilient insert are rounded to avoid concentration of stress along a sharp edge under load. The sizes and shapes of the grooves 13 and of the resilient inserts 15 are not critical, it only being necessary that the resilient inserts 15 be large enough to stay in the grooves under their own resiliency during operation of the moving stairway and to extend out of the grooves beyond the roots of the teeth far enough to effectively cushion the rollers as they are received between the teeth.

In the operation of the moving stairway, the resilient inserts 15 cushion the rollers 9 as they are received between the teeth deforming under the rollers and easing the rollers silently into their normal seats at the bottoms of the spaces between the teeth. FIG. III shows the resilient insert 15 free and FIG. IV shows the resilient insert 15 under chain roller load. The resilient inserts 15 are not compressed under the chain roller load but rather flow under load into the spaces 16 which are shown in FIG. III to fill such spaces as shown in FIG. IV. The sprocket wheel 5 with its resilient inserts is rugged and simple, of low cost, has a long field life, and produces a relatively silent step chain operation. The drive is equally efficacious in any system requiring a silently operable drive chain.

A modified sprocket wheel is illustrated in FIG. V. Reference numbers in FIG. V which are similar to those in FIGS. I–IV refer to parts which are alike in structure and in function. FIG. V corresponds to FIG. II. The only difference between the modified sprocket wheel 5a and the sprocket wheels 5 hereinbefore described is that the modified wheel 5a has grooves 13a which has shapes different from those of the grooves 13. The grooves 13a each has a round bottom, the inserts 15a of square cross-section as viewed in FIG. V being of a size such that some force must be used in pushing them into the grooves. The resiliency of the inserts 15 holds them in the grooves during the operation of the moving stairway. In the operation of the moving stairway, the resilient inserts 15a cushion the rollers as they are received between the teeth deforming under the rollers and easing the rollers silently into their normal seats.

Another modified sprocket wheel is illustrated in FIG. VI. Reference numbers in FIG. VI which are similar to those in FIGS. I–IV refer to parts which are alike in structure and in function. FIG. VI corresponds to FIG. II. The only difference between the modified sprocket wheel 5b and the sprocket wheels 5 hereinbefore described is that the modified wheel 5b has resilient inserts 15b which have shapes different from those of the resilient inserts 15. The resilient inserts 15b each has a normal end view which is round, i.e., before insertion in the grooves 13b, when oriented as viewed in FIG. VI. The diameter of such round end is greater than the width of the groove 13b so that the resilient insert is deformed when it is received in the groove and assumes the shape shown in FIG. VI. The resiliency of the deformed inserts 15b holds them in the grooves during operation of the moving stairway. In the operation of the moving stairway, the resilient inserts 15b cushion the rollers as they are received between the teeth deforming under the rollers and easing the rollers silently into their normal seats.

Another modified sprocket wheel is illustrated in FIG. VII. Reference numbers in FIG. VII which are similar to those in FIGS. I–IV refer to parts which are alike in structure and in function. FIG. VII corresponds to FIG. II. The only difference between the modified sprocket wheel 5c and the sprocket wheels 5 hereinbefore described is that the grooves 13c in the modified wheel 5c have sides which slant outwardly from the bottoms of the grooves toward the sprocket teeth whereas the grooves 13 in the wheels 5 have rectangular shapes as viewed in FIG. II. The shapes of the grooves 13c makes them relatively easy to cut, i.e., such shapes conform to metal forming practice. Any angle for the slanted groove sides can be used; however, if such angle is great enough, the resilient inserts 13c must be secured in the grooves 13c by means of an adhesive. In the operation of the moving stairway, the resilient inserts 15c cushion the rollers as they are received between the teeth deforming under the rollers and easing the rollers silently into their normal seats.

In some instances, the resilient inserts might project out of the grooves so far beyond the teeth roots that the rollers cannot seat in their normal seats at the bottoms of the spaces between the teeth. However, preferably the rollers are eased silently into their normal seats. It is not intended that the invention be restricted either to sprocket wheels that carry chain rollers on the resilient surfaces of the inserts or in contact with the material of the wheels themselves; conceivably, the sizes and arrangements of the parts might be such as to cause either condition or combinations of such conditions to be present during the operation of the moving stairway. It is advantageous, however, that each of the chain rollers seat in its normal seat, i.e., a metal to metal bearing surface, as shown in FIG. IV because this centers the rollers between the teeth. The centering of a roller between two teeth by easing it into its normal seat so locates or lines up the next succeeding roller that it is received centrally between the teeth with which it is to mesh. Thus, the succeeding roller is assured of engaging the resilient insert therein without first coming noisily in contact with a side of a tooth.

Various modifications in details of construction may be made without departing from the spirit and scope of the invention.

Having described the invention, I claim:

1. A sprocket wheel for a stairway step chain including link-connected rollers in a moving stairway, said wheel comprising peripherally spaced teeth defining spaces at least some of which receive chain rollers and defining a groove opening at a side of the wheel between the teeth at each of the chain roller receiving spaces and a resilient insert received in each of the grooves for cushioning the chain during operation of the moving stairway, the inserts deforming under load and easing the rollers silently into contact with the teeth.

2. A sprocket wheel according to claim 1 wherein the inserts fit so tightly in the grooves that the resiliency of the inserts keeps them in the grooves during operation of the moving stairway.

3. A sprocket wheel according to claim 1 wherein the length of the inserts is less than the length of the grooves to leave spaces in the grooves into which the inserts flow under load.

4. A sprocket wheel according to claim 1 wherein the grooves and the inserts have similar shapes.

5. A sprocket wheel according to claim 1 wherein the grooves and the inserts have dissimilar shapes.

6. A sprocket wheel for an endless drive chain, said wheel comprising peripherally spaced teeth and defining cavities each having two open ends between at least some of the teeth and a resilient insert in each of the cavities for cushioning the chain when during operation of the chain it is received by the wheel, the inserts deforming under load and easing the chain silently into contact with the teeth.

7. A sprocket wheel according to claim 6 wherein the inserts fit so tightly in the cavities that the resiliency of the inserts keeps them in the cavities during operation of the chain.

8. A sprocket wheel according to claim 6 wherein the length of the inserts is less than the length of the cavities to leave spaces in the cavities into which the inserts flow under load.

9. A sprocket wheel for an endless drive chain including link-connected rollers, said wheel comprising peripherally spaced teeth defining spaces at least some of which receive chain rollers and defining a groove opening at a side of the wheel between the teeth at each of the chain roller receiving spaces and a resilient insert which is received in each of the grooves and which normally projects out of the groove beyond the roots of the teeth for cushioning the chain, each of the inserts deforming under a roller to ease such roller silently into contact with the wheel in a centered location between two teeth whereby the next succeeding roller is lined up to be received centrally between two teeth directly upon the insert therein without first coming noisily in contact with a side of a tooth.

References Cited in the file of this patent

UNITED STATES PATENTS

| | | |
|---|---|---|
| 975,938 | Downey | Nov. 15, 1910 |
| 1,870,801 | Engstrom | Aug. 9, 1932 |
| 2,225,772 | Dunlop | Dec. 24, 1940 |

FOREIGN PATENTS

| | | |
|---|---|---|
| 719,694 | Great Britain | Dec. 8, 1954 |
| 816,028 | Great Britain | July 8, 1959 |
| 1,040,335 | Germany | Oct. 2, 1958 |
| | (Kl. 47h 11) | |